United States Patent [19]

Takahashi et al.

[11] Patent Number: 4,962,976

[45] Date of Patent: Oct. 16, 1990

[54] A.C. MOTOR DRIVE METHOD AND APPARATUS FOR PRECISION POSITIONAL CONTROL

[75] Inventors: Isao Takahashi, Nagaoka; Makoto Iwata, Kawaguchi, both of Japan

[73] Assignees: Sanken Electric Co., Ltd., Saitama; Isao Takahashi, Nigata, both of Japan

[21] Appl. No.: 445,480

[22] Filed: Dec. 4, 1989

[30] Foreign Application Priority Data

Mar. 11, 1989 [JP] Japan ................................. 64-158493

[51] Int. Cl.$^5$ ............................................. H02P 5/28
[52] U.S. Cl. ...................... 318/81; 318/739; 318/803; 318/801
[58] Field of Search ............... 318/739, 798, 799, 800, 318/801, 802, 803, 805, 806, 807, 811, 812

[56] References Cited

U.S. PATENT DOCUMENTS

| | | | |
|---|---|---|---|
| 4,366,427 | 12/1982 | Walker et al. | 318/807 |
| 4,640,389 | 2/1987 | Kamaike | 318/807 |
| 4,722,042 | 1/1988 | Asano et al. | 318/802 |
| 4,763,060 | 8/1988 | Takahashi | 318/811 |
| 4,843,297 | 6/1989 | Landino et al. | 318/811 |
| 4,885,518 | 12/1989 | Schauder | 318/807 |

OTHER PUBLICATIONS

Paper entitled "High Resolution Servo System of an Induction Motor Using Linear Mode Sliding Control", 1988 Nat'l Convention of the Japanese Institute of Electrical Engineers (no translation provided).

*Primary Examiner*—William M. Shoop, Jr.
*Assistant Examiner*—J. W. Cabeca
*Attorney, Agent, or Firm*—Woodcock, Washburn, Kurtz, Mackiewicz & Norris

[57] ABSTRACT

A polyphase induction motor is driven from an inverter having a set of switches activated in prescribed on-off patterns to provide forward and reverse voltage vectors and a zero vector for controllably energizing the motor. Memories are provided on which there are written forward voltage vector data for forwardly energizing the motor, reverse voltage vector data for reversely energizing the motor, and zero vector data for de-energizing the motor. The voltage vector data and zero vector data are selectively read out from the memories in order to cause the inverter to generate in real time the corresponding voltage vectors and zero vectors needed for the motor to be quickly revolved to, and set out of rotation exactly in, a desired angular position. For such optimum motor speed control an ideal control curve is predefined which represents the ideal relationship between the motor speed and the difference between the actual and the desired angular position of the motor. The voltage vector data and zero vector data are read out from the memories so that an actual control curve representative of the actual relationship between the motor speed and the difference between the actual and the desired angular position may approximate the ideal control curve as closely as possible.

13 Claims, 9 Drawing Sheets

| ADDRESS | 0 | 1 | 2 | 3 |
|---|---|---|---|---|
| FORWARD PWM PATTERN MEMORY $M_1$ | $V_6$ (110) | $V_2$ (010) | $V_6$ (110) | $V_2$ (010) |
| FORWARD ZERO VECTOR MEMORY $M_2$ | $V_7$ (111) | $V_0$ (000) | $V_7$ (111) | $V_0$ (000) |
| REVERSE PWM PATTERN MEMORY $M_3$ | $V_1$ (001) | $V_5$ (101) | $V_1$ (001) | $V_5$ (101) |
| REVERSE ZERO VECTOR MEMORY $M_4$ | $V_0$ (000) | $V_7$ (111) | $V_0$ (000) | $V_7$ (111) |

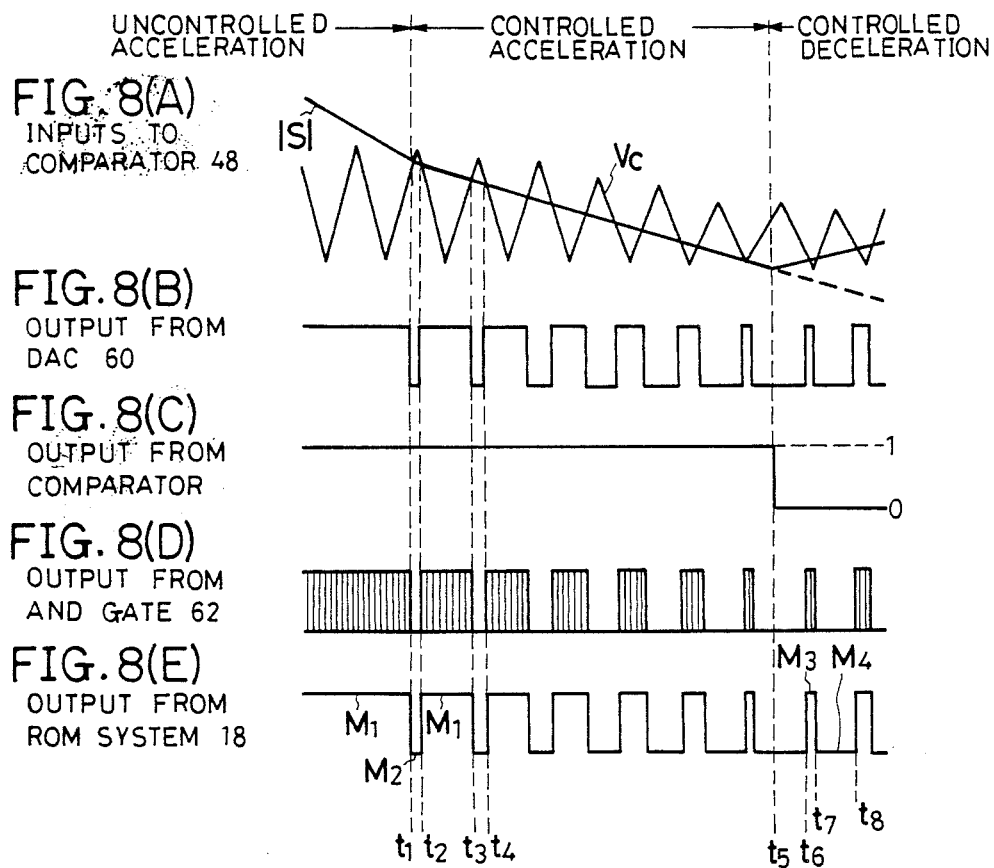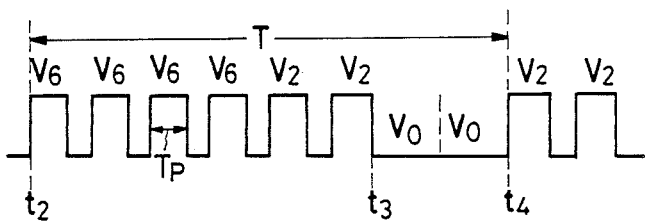

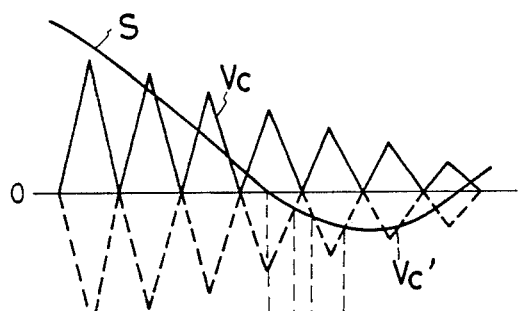
FIG. 12(A) INPUTS TO COMPARATOR 48
FIG. 12(B) OUTPUT FROM DAC 60
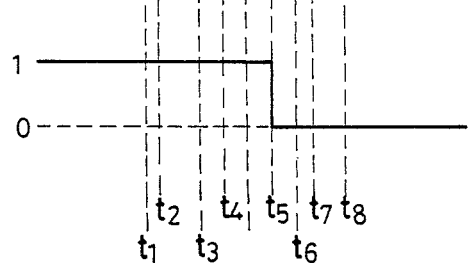
FIG. 12(C) OUTPUT FROM COMPARATOR 46

A.C. MOTOR DRIVE METHOD AND APPARATUS FOR PRECISION POSITIONAL CONTROL

BACKGROUND OF THE INVENTION

Our invention relates to a motor drive method, and more particularly to a method of, and an apparatus for, driving a reversible alternating-current (a.c.) motor such as a polyphase induction motor for accurate positional control of its rotor in moving any external driven member coupled thereto from one standstill position to another. Our invention represents an improvement of the method described and claimed in Takahashi U.S. Pat. No. 4,763,060, dated Aug. 9, 1988, so that we will incorporate its contents herein insofar as is necessary for a full understanding of our instant invention.

In some industrial applications of electric motors, such as industrial robots and numerically controlled machines, the need often arises for quickly moving a motor-driven member to a desired position and for arresting the motor rotation when the driven member arrives exactly at the desired position. A familiar method of such motor control is such that the difference between the desired and actual positions of the revolving part or rotor of the motor is constantly monitored. The motor speed is increased if the positional difference is large, and decreased if it is small.

A more refined system of motor position control was proposed by us in the paper entitled "High Resolution Servo System of an Induction Motor Using Linear Mode Sliding Control" at the 1988 national convention of the Japanese Institute of Electrical Engineers. We suggested in this paper to predetermine the curve representative of the ideal relationship between the positional difference and the motor speed, in order to assure accurate motor speed control in proportion with the positional difference. The positional difference and the motor speed were both gradually reduced to zero according to this ideal curve.

One of the present applicants, Takahashi, also proposed an a.c. motor drive method in the above cross-referenced U.S. Pat. No. 4,763,060. This known method employed a pulse-width-modulated (PWM) inverter for the speed control of an a.c. motor. Also employed were a set of memories for storing data representative of forward and reverse voltage vectors for creating and controlling a rotary field vector in the motor, and of zero vectors for arresting the rotation of the field vector. The PWM inverter switches connected to the a.c. motor were automatically turned on and off in accordance with the forward and reverse voltage vector data and zero vector data read out in a controlled sequence from the memories.

The method served its intended purpose, however, only to the extent that it made possible the use of a.c. motors in place of more expensive direct-current (d.c.) servomotors or stepper motors. There have been consistent demands in manufacturing and other industries for more advanced motor drive systems.

SUMMARY OF THE INVENTION

We have hereby invented how to drive a reversible a.c. motor for more accurate and positive speed and position control of its rotor, or of any external driven member coupled thereto, than heretofore.

Briefly stated in one aspect thereof, our invention concerns a method of controllably driving a reversible a.c. motor in revolving the same from one angular position to another. The motor is connected to an inverter having a set of switches to be activated in prescribed on-off patterns to provide forward and reverse voltage vectors and a zero vector for controllably energizing the motor. A memory means is provided which has written thereon forward voltage vector data representative of the on-off patterns of the inverter switches for forwardly energizing the motor, reverse voltage vector data representative of the on-off patterns of the inverter switches for reversely energizing the motor, and zero vector data representative of the on-off pattern of the inverter switches for deenergizing the motor.

For selectively reading out such vector data from the memory means for optimum motor speed control, an ideal control curve is predefined which represents the ideal relationship between the motor speed and the difference between the actual angular position of the motor and a desired angular position to which the motor is to be revolved. Also predefined are a controlled acceleration range and an uncontrolled acceleration range on one side of the ideal control curve, and a controlled deceleration range and an uncontrolled deceleration range on the other side of the ideal control curve. Both the controlled acceleration range and the controlled deceleration range decrease in width toward the origin of the rectangular coordinate system on which the ideal control curve is plotted.

Optimum motor speed control becomes possible by reading out the vector data from the memory means so that an actual control curve representative of the actual relationship between the motor speed and the difference between the actual and the desired angular position may approximate the ideal control curve as closely as possible. Specifically, for such optimum motor speed control, only the forward voltage vector data are read out from the memory means when the actual relation between the motor speed and the difference between the actual and the desired angular position is in the uncontrolled acceleration range, in order to cause the inverter to generate the forward voltage vectors for rapidly accelerating the motor. Both the forward voltage vector data and the zero vector data are read out from the memory means when the actual relation between the motor speed and the difference between the actual an the desired position is in the controlled acceleration range, in order to cause the inverter to generate the forward voltage vectors and the zero vector for controllably accelerating the motor. Both the reverse voltage vector data and the zero vector data are read out from the memory means when the actual relation between the motor speed and the difference between the actual and the desired angular position is in the controlled deceleration range, in order to cause the inverter to generate the reverse voltage vectors and the zero vector for controllably decelerating the motor. Only the reverse voltage vector data are read out from the memory means when the actual relation between the motor speed and the difference between the motor actual and the desired angular position is in the uncontrolled deceleration range, in order to cause the inverter to generate the reverse voltage vectors for rapidly decelerating the motor.

Our invention also specifically concerns an apparatus for use in carrying out the above summarized method. The actual control curve can be closely approximated to the ideal control curve by an electronic control system including a programmed microcomputer.

The ideal control curve is such that, generally, the motor speed is decreased with a decrease in the difference between the actual and desired angular motor positions, so that the motor speed becomes zero exactly at the desired angular position. Particular attention is invited to the fact that the controlled acceleration range and the controlled deceleration range on both sides of the ideal control curve generally decrease as the actual motor position draws near the desired position. Positive speed control is therefore possible when a relatively large difference exists between the actual and desired positions. As the difference decreases, more precise speed control becomes possible since then the speed control system functions as if its loop gain were increased. Any external driven member can thus be driven to, and stopped in, the exact position required.

The above and other features and advantages of our invention and the manner of realizing them will become more apparent, and the invention itself will best be understood, from a study of the following description and appended claims, with reference had to the attached drawings showing some preferred embodiments of our invention.

BRIEF DESCRIPTION OF THE DRAWINGS

FIG. 8, consisting of (A)-(E), is a timing diagram showing the waveforms appearing in the various parts of the FIG. 1 system in proper time relationship to one another in order to explain the operation of the FIG. 1 system;

FIG. 10 is a waveform diagram showing part of the waveform (E) of FIG. 8 in greater detail;

FIG. 12, consisting of (A)-(C), is a timing diagram explanatory of the operation of the alternative digital signal processor of FIG. 11.

DETAILED DESCRIPTION OF THE INVENTION

Motor Drive System

We will now describe our invention as adapted for the speed and position control of a three-phase induction motor by a three-phase PWM inverter. Thus the exemplified motor drive system shown in FIG. 1 includes the induction motor 10 to be controlled. Connected to the induction motor 10 is the PWM inverter 12 for controllably driving the same by the method of our invention.

Figure 2:
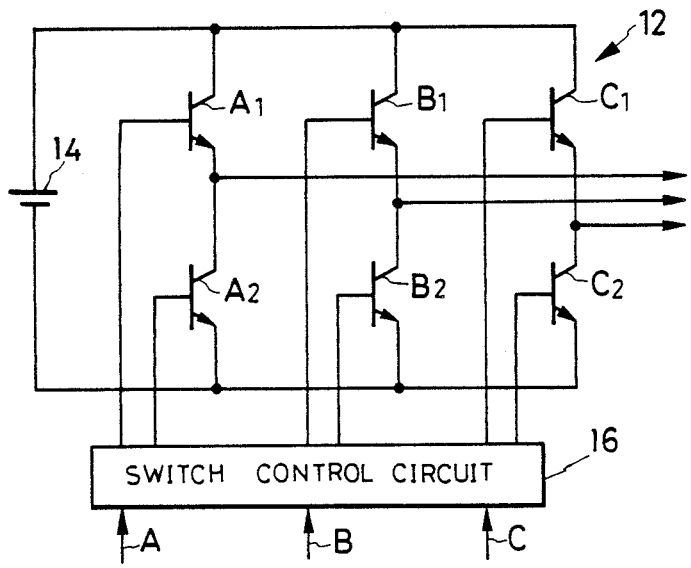
FIG. 2 is a schematic electrical diagram showing the inverter of the FIG. 1 system in more detail.

FIG. 2 is a detailed representation of the PWM inverter 12. It has three pairs of switching transistors $A_1$ and $A_2$, $B_1$ and $B_2$, and $C_1$ and $C_2$ of bridge connection across a d.c. power supply 14. All these switching transistors have their bases connected to a switch control circuit 16 thereby to be controllably activated. The upper group, as seen in FIG. 2, of three transistors $A_1$, $B_1$ and $C_1$ and the lower group of transistors $A_2$, $B_2$ and $C_2$ operate in opposite relation to each other. Consequently, to control the operation of either group is to control the operation of the other.

With reference back to FIG. 1 we have employed for such control of the PWM inverter 12 a memory or storage system 18 of the read-only variety (ROM). The ROM system 12 delivers three binary control signals A, B and C to the switch control circuit 16 for switching the respective pairs of inverter transistors in various prescribed switching patterns to be set forth subsequently. The upper group of switching transistors $A_1$, $B_1$ and $C_1$ become conductive when the associated control signals A, B and C are binary ONE, and nonconductive when the control signals are binary ZERO.

The ROM system 18 may be preprogrammed to store the prescribed PWM switching patterns in the form of vector data for the PWM control of the inverter 12. For the storage of such switching patterns the ROM system 18 is shown to have four constituent memories: A forward PWM switching pattern memory $M_1$, a forward zero vector memory $M_2$, a reverse PWM switching pattern memory $M_3$, and a reverse zero vector memory $M_4$.

We will later explain the data stored in these memories $M_1$-$M_4$ under the heading of "Stored Data". Suffice it to say for the moment that the forward PWM switching pattern memory $M_1$ stores voltage vector data used for driving the motor 10 in a forward direction; the forward zero vector memory $M_2$ stores zero vector data used during forward motor driving; the reverse PWM switching pattern memory $M_3$ stores voltage vector data used for energizing the motor in a reverse direction; and the reverse zero vector memory $M_4$ stores zero vector data used during reverse motor energization.

The vector data in the memories $M_1$-$M_4$ are to be read out in selected combinations for activating the inverter switches for optimum motor speed control. How the vector data are chosen for controlled driving of the motor 10 will be discussed under the heading of "Selection of Vectors".

Typically, each of the memories $M_1$-$M_4$ has 512 storage locations, from Address 0 to Address 511. The 512 storage locations of each memory are addressed by a nine-bit binary signal fed from a bidirectional (forward- /backward) counter 20 by way of lines 22. However, only one of the four memories $M_1$–$M_4$ is chosen at one time, and the data read out from the specified storage location of the specified memory is actually used for controlling the PWM inverter 12 and hence the motor 10.

The ROM system 18 has two additional input terminals 24 and 26 in order to permit its four constituent memories $M_1$–$M_4$ to be individually chosen for data transmission to the switch control circuit 16. The input terminal 24 is for receiving a zero vector select signal, and the other input 26 for receiving a forward/reverse select signal. Either the forward PWM switching pattern memory $M_1$ or the reverse PWM switching pattern memory $M_3$ is chosen when the zero vector select signal is binary ONE, and either the forward zero vector memory $M_2$ or the reverse zero vector memory $M_4$ is chosen when the zero vector select signal is binary ZERO. Either the memory $M_1$ or $M_2$ is chosen when the forward/reverse select signal is binary ONE, and either the memory $M_3$ and $M_4$ is chosen when the forward/reverse select signal is binary ZERO.

Let the nine bits of the address output from the bidirectional counter 20 be $[A_0, A_1, A_3, \ldots A_8]$, the zero vector select signal be $[A_9]$, and the forward/reverse select signal be $[A_{10}]$. Then the bits $[A_0$–$A_8]$ identify each address of each of the four memories $M_1$–$M_4$. Further, out of these memories, the forward PWM switching pattern memory $M_1$ is chosen when the bits $[A_9, A_{10}]$ are [11]; the forward zero vector memory $M_2$ when the bits $[A_9, A_{10}]$ are [01]; the reverse PWM switching pattern memory $M_3$ when the bits $[A_9, A_{10}]$ are [10]; and the reverse zero vector memory $M_4$ when the bits $[A_9, A_{10}]$ are [00]. It thus becomes possible to address each of the 512 different storage locations of each of the four different memories $M_1$–$M_4$ by the combinations of the binary values of the nine-bit address signal plus one-bit zero vector select signal and one-bit forward/reverse select signal.

For controlling the output voltages of the PWM inverter 12 via the ROM system 18 and counter 20 in accordance with the actual speed of the motor 10, we have connected a position sensor 28 to the motor 10. Typically, the position sensor 28 takes the form of a pulse generator or encoder capable of generating 1,296,000 pulses per revolution to provide ACTUAL POSITION DATA $\theta$. The position sensor 28 is coupled via output lines 30 to a deviation signal generator circuit 32 for the delivery of the ACTUAL POSITION DATA $\theta$ thereto. Also inputting DESIRED POSITION DATA $\theta_s$ from an external source, not shown, via lines 34, the deviation signal generator circuit 32 computes the difference between ACTUAL POSITION DATA and DESIRED POSITION DATA and puts out a deviation signal representative of that difference. We understand that the deviation signal generator circuit 32 includes a 24-bit bidirectional counter for counting the output pulses (ACTUAL POSITION DATA) of the position sensor 28.

The deviation signal generator circuit 32 has a 24-bit output line connected to a digital signal processor (DSP) 36. This DSP 36 can be a preprogammed microcomputer in practice. For the ease of understanding, however, we have shown the DSP 36 as comprising a bit limiter circuit 38, a speed detector circuit 40, an arithmetic circuit 42, a triangular wave generator circuit 44, a first 46 and a second 48 comparator circuit, and an absolute value circuit 50.

The bit limiter circuit 38 and the speed detector circuit 40 are both connected directly to the deviation signal generator circuit 32. The bit limiter circuit 38 reduces the incoming 24-bit deviation signal to a 16-bit deviation signal (POSITION ERROR DATA) $\Delta\theta$ preparatory to delivery to the arithmetic circuit 42.

The speed detector circuit 40 comprises a delay circuit 52 and a subtractor circuit 54. As the deviation signal generator circuit 32 supplies the deviation signal at preassigned sampling intervals, the delay circuit 52 delays each sample by one sampling period. The subtractor circuit 54 inputs both each present sample and the preceding sample and computes the difference therebetween. Further the speed detector circuit 40 computes and puts out SPEED DATA W from the rate of change of the successive samples per unit length of time. The SPEED DATA W is fed to the arithmetic circuit 42 along with the POSITION ERROR DATA $\Delta\theta$.

During each sampling period the arithmetic circuit 42 processes the incoming SPEED DATA W and POSITION ERROR DATA $\Delta\theta$ according to the equation:

$$S = K_1 \cdot \Delta\theta - K_2 \cdot W^2$$

if the position error is positive, and according to the equation:

$$S = K_1 \cdot \Delta\theta + K_2 \cdot W^2$$

if the position error is negative. The $K_1$ and $K_2$ of the above equations are both constants. The output S from the arithmetic circuit 42 represents the possible departure of the actual speed from the ideal speed at the given position error.

Figure 1:
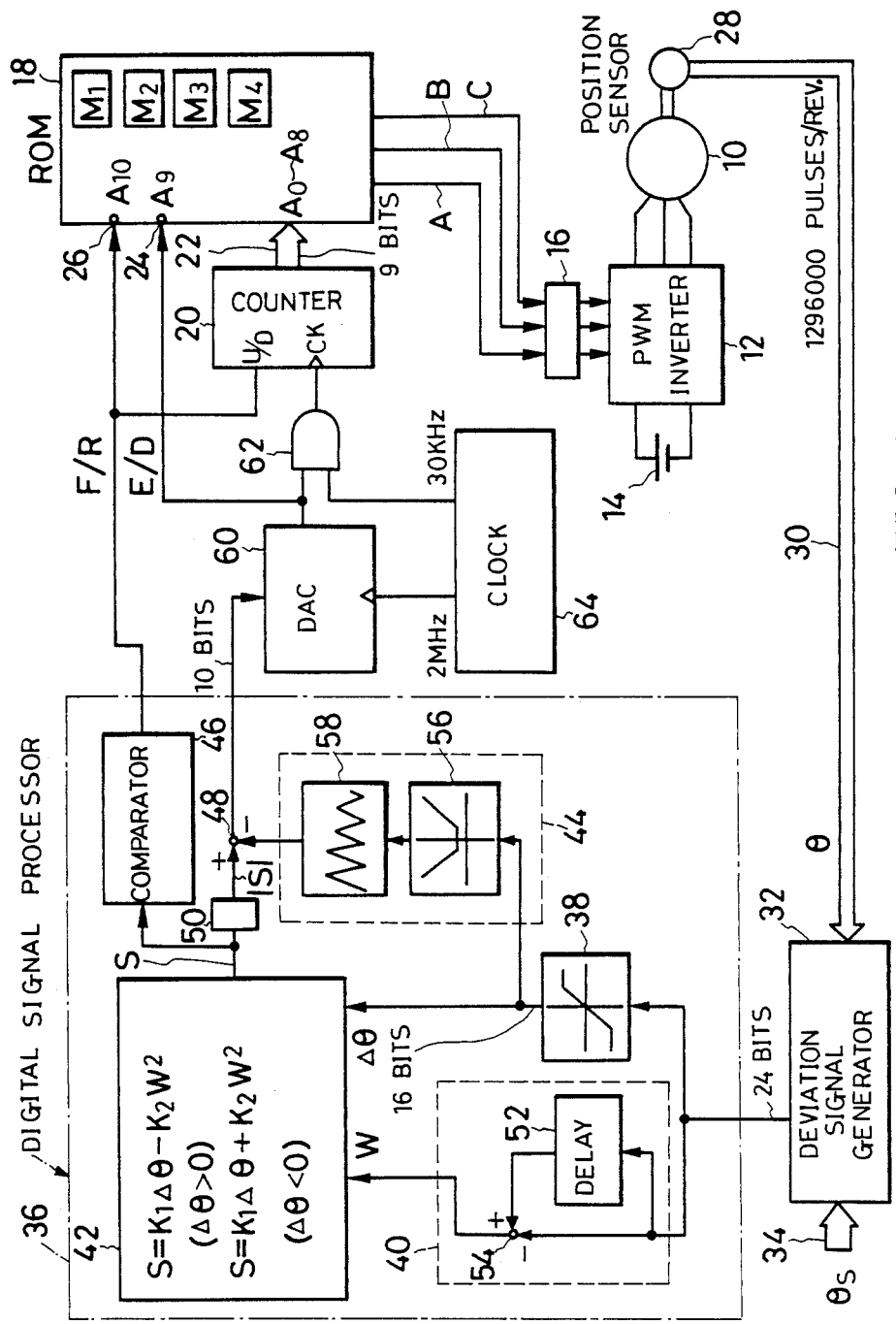
FIG. 1 is a block diagram of the a.c. motor drive system constructed in accordance with the principles of our invention.
Figure 3:
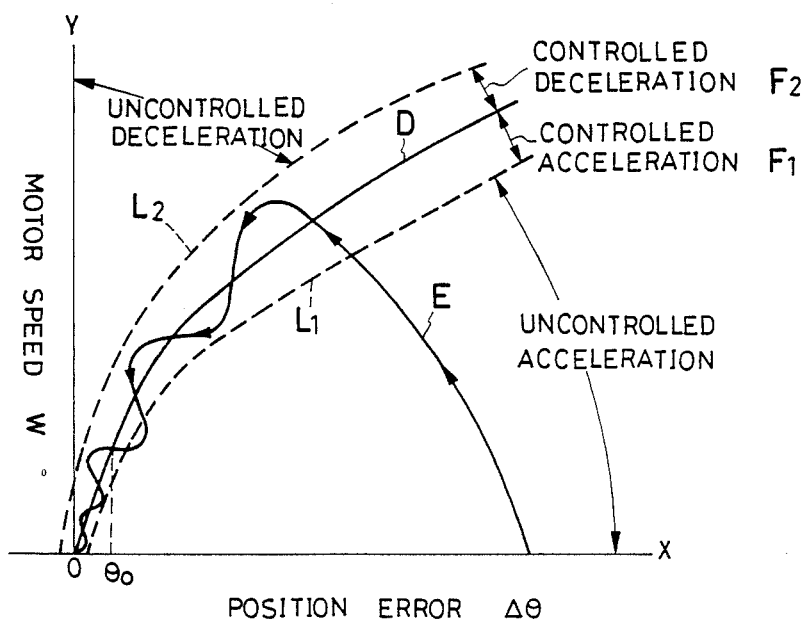
FIG. 3 is a graphic representation of the ideal control curve and the actual control curve, both representing the relationships between the motor speed and the difference between the desired and actual angular positions of the motor, the graph also showing the controlled acceleration range and uncontrolled acceleration range on one side of the ideal control curve, and the controlled deceleration range and uncontrolled deceleration range on the other side of the ideal control curve.

Before proceeding further with the description of the motor drive system of FIG. 1, we will explain the principles of our invention in conjunction with the DSP 36. Reference is directed to FIG. 3 for such explanation. The x-axis of the rectangular coordinate system shown here represents the POSITION ERROR DATA $\Delta\theta$, and its y-axis represents the SPEED DATA W. The curve D in the graph indicates that relationship between POSITION ERROR DATA and SPEED DATA which satisfies the equation:

$$K_1 \cdot \Delta\theta - K_2 \cdot W^2 = 0.$$

Driven along the curve D, the motor 10 will most efficiently rotate and come to a stop in the desired position. We will therefore refer to this curve D as the IDEAL CONTROL CURVE.

Both position error $\Delta\theta$ and speed W of the above equation are variables, subject to change with time. However, for the ease of understanding we will use the indicia $\Delta\theta$ and W for all the possible values of the position error and the speed.

The curve E in FIG. 3 represents an example of possible variation of the output S from the arithmetic circuit 42 during the controlled rotation of the motor 10 from one standstill position to another. Thus the curve E may be termed the ACTUAL CONTROL CURVE. It will be observed that the ACTUAL CONTROL CURVE E generally follows the IDEAL CONTROL CURVE D except for some initial period immediately following motor startup. This is what we call the sliding method of controlling the motor speed W.

The region $F_1$ bounded by the IDEAL CONTROL CURVE D and the dashed LOWER CONTROL BOUNDARY CURVE $L_1$ in FIG. 3 may be termed a CONTROLLED ACCELERATION RANGE as the motor 10 can be controllably driven forwardly in this variable range. The region bounded by the LOWER CONTROL BOUNDARY CURVE $L_1$ and the x-axis is an UNCONTROLLED ACCELERATION RANGE. Similarly, the region $F_2$ bounded by the IDEAL CONTROL CURVE D and the dashed UPPER CONTROL BOUNDARY CURVE $L_2$ may be termed a CONTROLLED DECELERATION RANGE as the motor 10 can be controllably energized in the reverse direction in this variable range. The region bounded by the UPPER CONTROL BOUNDARY CURVE $L_2$ and the y-axis is an UNCONTROLLED DECELERATION RANGE.

It will be noted that both CONTROLLED ACCELERATION RANGE $F_1$ and CONTROLLED DECELERATION RANGE $F_2$ are relatively wide and approximately constantly so when the position error is larger than the mean value. However, in accordance with a feature of our invention, the ranges $F_1$ and $F_2$ both gradually become narrower as the position error decreases.

As will be understood from the ACTUAL CONTROL CURVE E, in the CONTROLLED ACCELERATION RANGE $F_1$, the PWM inverter 12 is controlled in accordance with the forward voltage vector data read out from the first memory $M_1$ and with the forward zero vector data read out from the second memory $M_2$. The motor acceleration is controllable by varying the proportions of the times during which the forward voltage vector data and the forward zero vector data are read out.

In the CONTROLLED DECELERATION RANGE $F_2$, on the other hand, the PWM inverter 12 is controlled in accordance with the reverse voltage vector data read out from the third memory $M_3$ and with the reverse zero vector data read out from the fourth memory $M_4$. The deceleration control of the motor 10 is possible by varying the proportions of the times during which the reverse voltage vector data and the reverse zero vector data are read out. It will, of course, be understood that the reverse energization of the motor 10 is intended to decelerate its rotation, not to reverse its rotation.

In the UNCONTROLLED ACCELERATION RANGE between the x-axis and the LOWER CONTROL BOUNDARY CURVE $L_1$, the motor 10 is only accelerated by continuously reading out the forward voltage vector data from the first memory $M_1$. No forward zero vector data is read out from the second memory $M_2$.

In the UNCONTROLLED DECELERATION RANGE between the y-axis and the UPPER CONTROL BOUNDARY CURVE $L_2$, the motor 10 is only decelerated by continuously reading out the reverse voltage vector data from the third memory $M_3$. No reverse zero vector data is read out from the fourth memory $M_4$.

The output S of the DSP 36 is related to the ACTUAL CONTROL CURVE E. When the output S is positive, the corresponding point on the curve E is in either the CONTROLLED or UNCONTROLLED ACCELERATION RANGE. When the output S is negative, the corresponding point on the curve E is in either the CONTROLLED or UNCONTROLLED DECELERATION RANGE. When the output S is zero, the corresponding point on the curve E is on the IDEAL CONTROL CURVE D.

Referring back to FIG. 1, we will resume the description of the DSP 36. The triangular-wave generator circuit 44 is shown as a combination of an amplitude modulator circuit 56 and a digital triangular wave generator 58. Coupled directly to the bit limiter circuit 38 to input the 16-bit POSITION ERROR DATA $\Delta\theta$, the amplitude modulator circuit 56 functions to reduce the amplitude of the triangular wave with a decrease in the position error.

Figure 4:
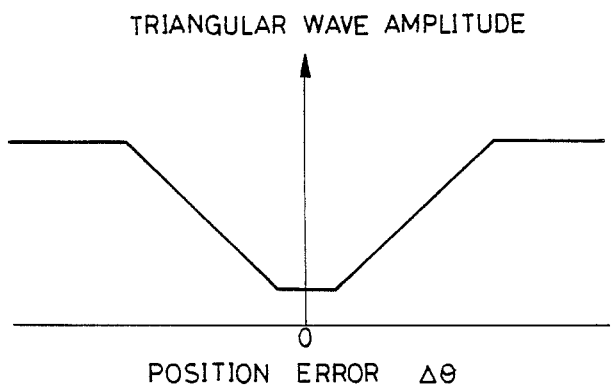
FIG. 4 is a graph plotting the curve of the amplitude of the triangular wave generated in the FIG. 1 system against the difference between the desired and actual angular positions of the motor.

FIG. 4 is an illustration of the analog equivalent of the triangular wave output from the generator circuit 44. The triangular wave has a repetition rate of two kilohertz, and its amplitude gradually decreases as the position error decreases past a predetermined limit. The amplitude is constant both when the position error is above the predetermined limit and when it is close to zero. This variable amplitude of the triangular wave corresponds to the variable CONTROLLED ACCELERATION RANGE $F_1$ and CONTROLLED DECELERATION RANGE $F_2$.

With reference again to FIG. 1 the output S from the arithmetic circuit 42 is fed both to the first comparator circuit 46 and, via the absolute circuit 50, to the second comparator circuit 48. The first comparator circuit 46 determines whether the input signal S is positive or negative. If it is positive, the first comparator circuit 46 puts out a binary ONE, conditioning the ROM system 18 to put out only the forward voltage vector data or the forward zero vector data from its first $M_1$ or second $M_2$ memory. If it is negative, on the other hand, then the first comparator circuit 46 puts out a binary ZERO to condition the ROM system 18 to put out only the reverse voltage vector data or the reverse zero vector data from its third $M_3$ or fourth $M_4$ memory. This forward/reverse select signal F/R from the first comparator circuit 46 is directed to the input 26 of the ROM system 18.

The second comparator circuit 48 compares the absolute value of the output S from the arithmetic circuit 42 and the triangular wave from the generator circuit 44. FIG. 8(A) shows the two inputs to the second comparator circuit 48. Comparing the two inputs, the second comparator circuit 48 generates and puts out 10-bit digital data indicative of the relative magnitudes of the inputs, for delivery to a digital-to-analog converter (DAC) 60, FIG. 1, external to the DSP 36.

In response to the 10-bit digital data from the second comparator circuit 48, the DAC 60 generates a train of pulses of constant amplitude and variable durations, as drawn in FIG. 8(B). The high state of the DAC output commands the readout of the forward or reverse voltage vector data from the first $M_1$ or third $M_3$ memory. The low state of the DAC output commands the readout of the forward or reverse zero vector data from the second $M_2$ or fourth $M_4$ memory.

For the delivery of such energize/de-energize select commands E/D to the ROM system 18, the DAC 60 has its output connected to the input 24 of the ROM system, besides being connected and to one of the two inputs of an AND gate 62. The output of this AND gate is connected to the clock input CK of the bidirectional counter 20.

Connected to the other input of the AND gate 62 is a clock 64 from which 30-kilohertz clock pulses are supplied. The clock 64 has an additional output connected to the DAC 60 for supplying two-megahertz clock pulses thereto. The 30-kilohertz clock pulses pass the AND gate 62 when the DAC output is high, causing the counter 20 to increment the memory addresses.

Stored Data

Figures 5, 6:
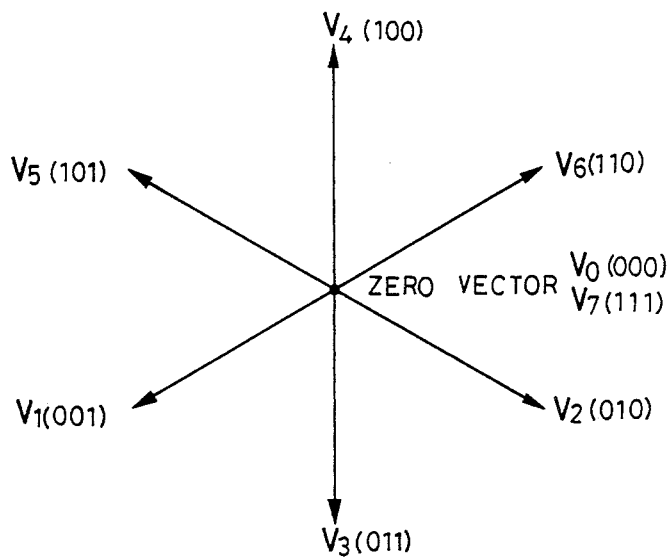
FIG. 5 is a table showing some of the voltage vector data and zero vector data written on the memories in the FIG. 1 system.
FIG. 6 is a schematic illustration of the voltage vectors represented by the vector data of FIG. 5.

FIG. 5 is explanatory of the vector data stored in the memories $M_1-M_4$ of the ROM system 18. The data are stored in the form of the binary coded representations of six voltage vectors $V_1-V_6$ and two zero vectors $V_0$ and $V_7$. We will define these voltage and zero vectors in the next chapter. Each constituent memory of the ROM system 18 has Addresses 0-511 as aforesaid. We have illustrated by way of example in FIG. 5 the data that are written only at the first four addresses, Addresses 0-3, of each memory.

The forward PWM switching pattern memory $M_1$ stores voltage vectors $V_6$, $V_2$, $V_6$ and $V_2$ at its Addresses 0-3. The forward zero vector memory $M_2$ stores zero vectors $V_7$, $V_0$, $V_7$ and $V_0$. The reverse PWM switching pattern memory $M_3$ stores voltage vectors $V_1$, $V_5$, $V_1$ and $V_5$. The reverse zero vector memory $M_4$ stores zero vectors $V_0$, $V_7$, $V_0$ and $V_7$. Each memory has additional vector data written likewise at its remaining Addresses 4-511.

We have given the vector data of FIG. 5 purely to illustrate the principles of our invention; they do not represent the actual sequence of vectors that may be written on the memories in the practice of our invention. An example of actual sequence of voltage vectors that may be stored at Addresses 0-84 (corresponding to the angular positions 0-60 degrees of the rotor of the motor 10) of the forward PWM switching pattern memory $M_1$ is: $V_6$, $V_6$, $V_6$, $V_6$, $V_2$, $V_2$, $V_2$, $V_2$, $V_2$, $V_2$, $V_6$, $V_6$, $V_6$, $V_6$, $V_2$, $V_2$, $V_2$, $V_2$, $V_2$, $V_2$, $V_6$, $V_6$, $V_6$, $V_6$, $V_2$, $V_2$, $V_2$, $V_2$, $V_2$, $V_2$, $V_2$, $V_2$, $V_2$, $V_2$, $V_2$, $V_2$, $V_2$, $V_2$, $V_2$, $V_2$, $V_2$, $V_2$, $V_2$, $V_2$, $V_2$, $V_2$, $V_2$, $V_2$, $V_2$, $V_2$, $V_2$, $V_2$, $V_2$, $V_2$, $V_2$, $V_2$, $V_2$, $V_2$, $V_3$, $V_3$, $V_3$, $V_3$, $V_2$, $V_2$, $V_2$, $V_2$, $V_2$, $V_2$, $V_3$, $V_3$, $V_3$, $V_3$, $V_2$, $V_2$, $V_2$, $V_2$, $V_2$, $V_2$, $V_3$, $V_3$, $V_3$ and $V_3$.

Voltage Vectors and Zero Vectors

The six voltage vectors $V_1-V_6$ and two zero vectors $V_0$ and $V_7$ are hereby defined as diagrammatically illustrated in FIG. 6. The switching transistors $A_1$, $B_1$ and $C_1$, FIG. 2, of the PWM inverter 12 can be switched on or off in the eight different combinations of [000], [001], [010], [011], [100], [101], [110] and [111]. These switching patterns are allotted to the vectors $V_0-V_7$ as follows: $V_0=[000]$, $V_1[001]$, $V_2=[010]$, $V_3=[011]$, $V_4=[100]$, $V_5=[101]$, $V_6=[110]$ and $V_7=[111]$.

These binary data representative of the vectors $V_0-V_7$ are written on the ROM system 18 and are read out for delivery to the switch control circuit 16 as the control signals A, B and C. The switch control circuit 16 will then respond to these control signals for activating the inverter switches $A_1-C_1$ and $A_2-C_2$ in the various desired patterns. The voltage vectors $V_1-V_6$ and zero vectors $V_0$ and $V_7$ are selectively read out to provide an approximately sinusoidal voltage and revolving field vector for the motor 10, as will be explained in more detail hereafter.

Selection of Vectors

Figure 7:
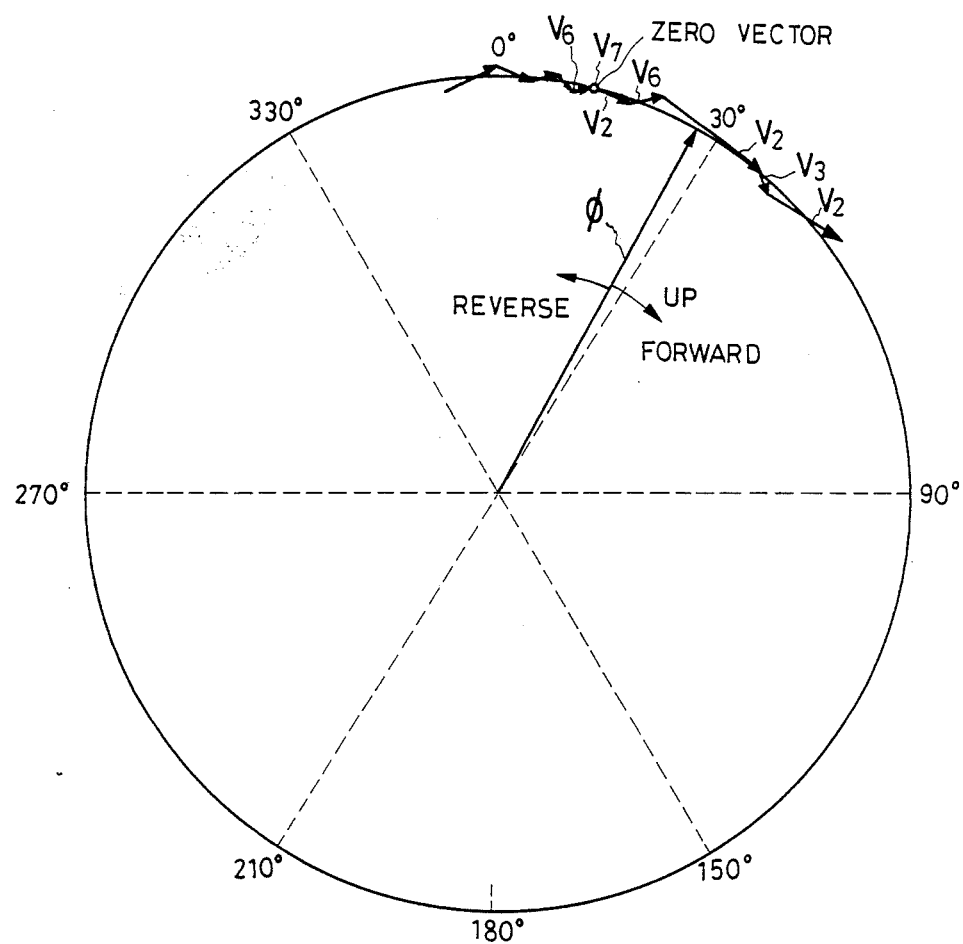
FIG. 7 is a schematic illustration explanatory of the way in which a revolving field vector is set up in the motor by the voltage vectors and zero vectors of FIG. 6.

Reference is now directed to FIG. 7 for a discussion of how the voltage vectors may be chosen successively for providing the desired revolving field vector $\phi$. In order for the extremity of the revolving field vector $\phi$ to follow a locus that approximates a circle as closely as possible, there may be chosen the voltage vectors $V_6$ and $V_2$ from 330° to 30°, the voltage vectors $V_2$ and $V_3$ from 30° to 90°, the voltage vectors $V_3$ and $V_1$ from 90° to 150°, the voltage vectors $V_1$ and $V_5$ from 150° to 210°, the voltage vectors $V_5$ and $V_4$ from 210° to 270°, and the voltage vectors $V_4$ and $V_6$ from 270° to 330°.

We have shown in FIG. 7 only the voltage vectors $V_2$ and $V_6$ chosen for the angle from 330° to 30° and the vectors $V_2$ and $V_3$ chosen for the angle from 30° to 90°. Also, in FIG. 4, the zero vector $V_7$ is chosen for arresting the rotation. It will be further noted from this figure that the revolving field vector moves in a clockwise direction, designated UP, to cause motor rotation in a predetermined forward direction, and in a counterclockwise direction DOWN to reverse or retard the motor rotation.

Operation

During the rotation of the three-phase induction motor 10 the position sensor 28 will constantly deliver the ACTUAL POSITION DATA $\theta$ to the deviation signal generator circuit 32. This circuit 32 will compare the ACTUAL POSITION DATA $\theta$ with the DESIRED POSITION DATA $\theta_s$ supplied by way of the lines 34 and deliver the resulting POSITION ERROR DATA $\Delta\theta$ to the arithmetic circuit 42 via the bit limiter circuit 38.

Initially, as will be understood from FIG. 3, the position error will be so great that the motor 10 must be accelerated through the UNCONTROLLED ACCELERATION RANGE until the ACTUAL CONTROL CURVE E enters the CONTROLLED ACCELERATION RANGE $F_1$. The arithmetic circuit 42 will compute the value S from the input POSITION ERROR DATA $\Delta\theta$ and SPEED DATA W according to either of the two equations of FIG. 1 in order to control the motor speed as close as possible to the IDEAL CONTROL CURVE D.

As depicted before the time $t_1$ in FIG. 8(A), the value S being fed to the second comparator circuit 48 will be above the triangular wave $V_c$, also being fed to the second comparator circuit 48 from the generator circuit 44, when the motor speed is in the UNCONTROLLED ACCELERATION RANGE. The DAC 60 will respond to this result of comparison by continuously producing a high output as in FIG. 8(B) thereby causing the counter 20 to increment the addresses of the first memory $M_1$. Thus, as the forward voltage vector data are sequentially read out from the first memory $M_1$ as in FIG. 8(E), the motor 10 will be continuously accelerated through the UNCONTROLLED ACCELERATION RANGE along the ACTUAL CONTROL CURVE E in FIG. 3.

Then, as the ACTUAL CONTROL CURVE E enters the CONTROLLED ACCELERATION RANGE $F_1$ at the time $t_1$ in FIG. 8, the value S will cross the triangular wave $V_c$, as during time intervals $t_1-t_2$ and $t_3-t_4$. The output from the DAC 60 will be low during these time intervals, as indicated in FIG. 8(B). The low DAC output will result in the readout of the forward zero vector data from the second memory $M_2$ and, in consequence, in temporary cessations of the forward energization of the motor 10. The DAC output will alternately go high and low when the ACTUAL CONTROL CURVE E is in the CONTROLLED ACCELERATION RANGE $F_1$ to cause optimum motor speed control as required by the actual motor speed and the position error.

The value S will become negative when the ACTUAL CONTROL CURVE E enters the CONTROLLED DECELERATION RANGE $F_2$ at the time $t_5$ in FIG. 8. Thereupon the first comparator circuit 46 will go negative, as in FIG. 8(C), thereby causing the third $M_3$ and fourth $M_4$ memories of the ROM system 18 to be read in response to the output from the counter 20. FIG. 8(E) shows that the reverse voltage vector data are read out from the third memory $M_3$ during the time interval $t_6$–$t_7$, and the reverse zero vector data from the fourth memory $M_4$ during the time interval $t_7$–$t_8$.

The ACTUAL CONTROL CURVE E will again cross the IDEAL CONTROL CURVE D and enter the CONTROLLED ACCELERATION RANGE $F_1$ as a result of such controlled deceleration of the motor 10. Then the value S will again go positive to cause the forward voltage vector data and forward zero vector data to be read out from the first $M_1$ and second $M_2$ memories of the ROM system 18.

The foregoing cycle of controlled acceleration and controlled deceleration will repeat itself thereafter as graphically represented in FIG. 3. The motor 10 will gradually slow down as the position error decreases with each repetition of the cycle, until at last the motor comes to a stop when the position error becomes zero.

The reader's attention is again invited to the fact that both CONTROLLED ACCELERATION RANGE $F_1$ and CONTROLLED DECELERATION RANGE $F_2$ are widest when the position error is great, and gradually decrease approximately in proportion with the position error. When initially accelerated through the UNCONTROLLED ACCELERATION RANGE, the motor will pick up speed to such an extent that the ACTUAL CONTROL CURVE E will surge considerably beyond the IDEAL CONTROL CURVE D because of inertial rotation. However, the CONTROLLED DECELERATION RANGE $F_2$ is then so wide that the ACTUAL CONTROL CURVE E will not enter the UNCONTROLLED DECELERATION RANGE but, controllably decelerated in the CONTROLLED DECELERATION RANGE, will curve back into the CONTROLLED ACCELERATION RANGE $F_1$. This range $F_1$ is also initially so wide that the motor will be controllably accelerated back into the CONTROLLED DECELERATION RANGE $F_2$. Thus the motor will be driven through the required angle with a minimum waste of time and energy and come to a stop in the exact angular position required.

A reference back to FIG. 8 will indicate that the absolute value $|S|$ crosses the triangular wave $V_c$ when the ACTUAL CONTROL CURVE E is within both CONTROLLED ACCELERATION RANGE $F_1$ and CONTROLLED DECELERATION RANGE $F_2$. The amplitude of the triangular wave $V_c$ grows less with a decrease in the position error and so realizes the corresponding decrease in the widths of the CONTROLLED ACCELERATION RANGE and CONTROLLED DECELERATION RANGE.

The provision of the CONTROLLED ACCELERATION RANGE and CONTROLLED DECELERATION RANGE results, of necessity, in the provision of the UNCONTROLLED ACCELERATION RANGE and UNCONTROLLED DECELERATION RANGE. We prefer the presence of the UNCONTROLLED ACCELERATION RANGE in particular because of the higher control loop gain, so to say, achieved as the motor is accelerated through the UNCONTROLLED ACCELERATION RANGE with the forward voltage vectors only.

Possibly, and as depicted in FIG. 3, the ACTUAL CONTROL CURVE E may temporarily deviate from the CONTROLLED ACCELERATION RANGE $F_1$ or CONTROLLED DECELERATION RANGE $F_2$ of reduced width as the position error becomes smaller. Such temporary deviations will present no problem at all because of the lower motor speed.

Figure 9:
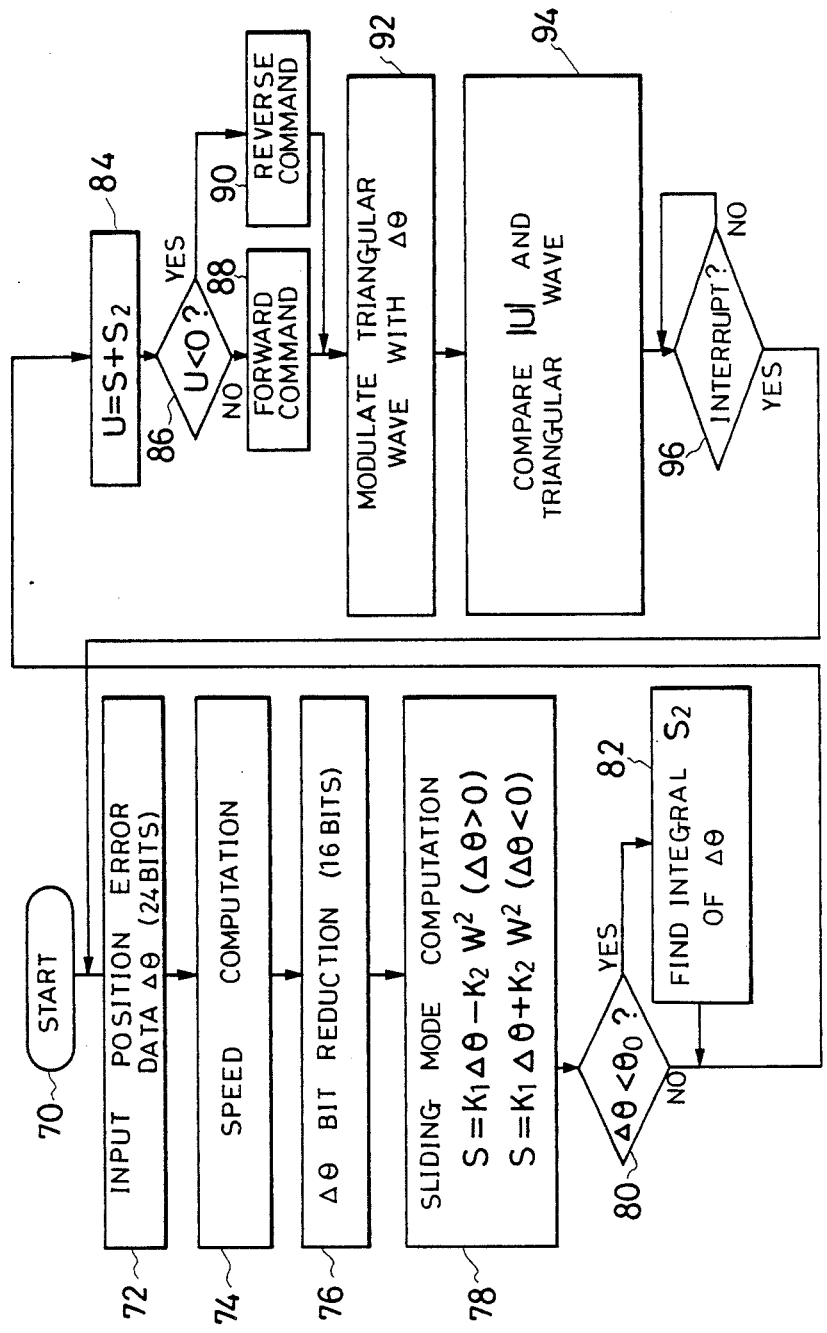
FIG. 9 is a flow chart showing the program introduced into the digital signal processor of the FIG. 1 system.

The flow chart of FIG. 9 represents the motor control program which may be introduced into the DSP 36 in the practice of our invention. Following the start of the program at Step 70, the 24-bit deviation signal or POSITION ERROR DATA is input at Step 72. The motor speed is computed from the input data at Step 74. The 24-bit POSITION ERROR DATA is reduced to 16-bit data at Step 76. The value S is computed at Step 78 from the computed motor speed and the 16-bit POSITION ERROR DATA.

Then, at Step 80, it is ascertained whether or not the actual position error value $\theta$ is less than a predetermined position error value $\theta_0$ which, as indicated in FIG. 3, is set close to zero. We have not mentioned this step in the foregoing operational description of the DSP 36 as it constitutes an incidental or optional feature of our invention.

If the actual position error $\Delta\theta$ is less than the predetermined mined value $\theta_0$, the integral $S_2$ of the position error is computed at Step 82. Then the values S and $S_2$ are added together to obtain the sum U at Step 84. The sum U is used as the forward/reverse select signal F/R, FIG. 1, in place of the value S. This use of U is intended to increase the apparent value of the position error and hence to extend the lengths of time during which the forward voltage vector data are read out. The consequent increase in motor torque will serve to prevent the motor from coming to a premature stop when the position error draws near to zero. We could, however, integrate the value S at Step 82 and add the result $S_2$ to S.

The next Step 86 is to determine whether the sum U is less than zero or not, just as whether the value S was more or less than zero was determined by the first comparator circuit 46, FIG. 1, of the DSP 36. A forward rotation command is given to the input 26 of the ROM system 18 at Step 88 if the sum U is not less than zero. If the sum U is less than zero, on the other hand, then a reverse energization command is given to the same input of the ROM system 18 at Step 90.

Then there is provided at Step 92 the triangular wave that has been amplitude modulated with the position error $\Delta\theta$. The amplitude-modulated triangular wave is compared with the absolute value $|U|$ at Step 94 for putting out data indicative of the required time ratio of the forward or reverse voltage vector data and forward or reverse zero vector data to be read out from the ROM system 18. Thereafter, if an interrupt signal is supplied at Step 96, the program may be restarted at Step 72.

The required forward or reverse voltage or zero vector data can be read out from the ROM system 18 in the same way as in the mentioned U.S. Pat. No. 4,763,060. We will explain in the following how such data are read out in response to the outputs from the two comparators 46 and 48 of the DSP 36.

Suppose that the output from the first comparator 46 of the DSP 36 is high, as indicated in FIG. 8(C) before the moment $t_5$. This high output is fed to the up/down input U/D of the bidirectional counter 20 thereby causing the same to count in an increasing direction as long as the first comparator output remains high. FIGS. 8(A) and 8(B) show that the DAC 60 connected to the second comparator 48 goes low when the triangular wave $V_c$ is of greater magnitude than the absolute value $|S|$, as during the time intervals $t_1$–$t_2$ and $t_3$–$t_4$, and high when the triangular wave is of less magnitude than the absolute value, and during the time interval $t_2$–$t_3$. The second memory $M_2$ is chosen to read out the forward zero vector data when the output from the DAC 60 is low, and the output from the first comparator 46 is high, that is, when $[A_9, A_{10}] = [01]$. The first memory $M_1$ is chosen to read out the forward voltage vector data when $[A_9, A_{10}] = [11]$.

The AND gate 62 inhibits the passage of the 30-kilohertz clock pulses when the output from the DAC 60 is low. Therefore, not incremented by the clock pulses, the bidirectional counter 20 continues specifying the same address of the ROM system 18 as long as the DAC output remains low. On the other hand, when the DAC output is high, the AND gate 62 permits the passage of the clock pulses on to the clock input CK of the counter 20. Thereupon the value of the nine-bit $[A_0$–$A_8]$ output from the counter 20 increases with each input clock pulse, thereby sequentially specifying the addresses of the first memory $M_1$.

When the DAC 60 subsequently goes low, the counter 20 becomes no loner clocked and, in consequence, holds the output that has been being delivered to the ROM system 18. Suppose that the DAC 60 has gone low when the forward voltage vector $V_6$ is being read out from Address 2, FIG. 5, of the first memory $M_1$. Then, since now the second memory $M_2$ has been chosen, Address 2 of this memory is specified, so that the zero vector $V_7$ is read out therefrom. This zero vector $V_7$ is to continue to be read out as long as the output from the DAC 60 remains low. When the DAC 60 subsequently goes high, and when the counter 20 is incremented by the first of the next series of clock pulses that have passed the AND gate 62, Address 3 of the first memory $M_1$ is specified to read out the forward voltage vector $V_2$ is read out therefrom.

There are two zero vectors, $V_0$ [000] and $V_7$ [111]. Either of the two zero vectors will be chosen which requires the switching of a smaller number of inverter switches $A_1$–$C_1$ and $A_2$–$C_2$.

The complete voltage vector data of the forward PWM pattern, covering the angle of 0–360 degrees, are read out with the completion of the production, by the counter 20, of the binary numbers corresponding to the decimal numbers 0–511. The readout of such voltage vector data from the ROM system 18 causes the inverter 12 to produce an approximately sinusoidal, three-phase voltage, with the consequent creation in the motor 10 of the revolving field vector that delineates an approximately circular locus.

It is self-evident that the reverse voltage vector data and reverse zero vector data are read out from the memories $M_3$ and $M_4$ in a like manner.

A comparison of (A) and (B) in FIG. 8 will reveal that the output pulses of the DAC 60 become progressively shorter in duration with a decrease in the amplitude of the triangular wave $V_c$ as the difference between the desired and actual positions decrease through the motor control process so far described. It is further seen from FIG. 8(E) that the periods during which the zero vector data $V_0$ or $V_7$ is read out from the second $M_2$ or fourth $M_4$ memory become progressively longer with the decreasing position error.

Let $t_2$ in FIG. 8 correspond to zero degree of the rotor position of the motor 10 for the convenience of description. Then, as illustrated in FIG. 10, the voltage vectors $V_6$, $V_6$, $V_6$, $V_6$, $V_2$ and $V_2$ will be produced with a constant duration $T_p$, during the period T of $t_2$–$t_4$, followed by the production of the zero vector $V_0$ from $t_3$ to $t_4$.

We have confirmed by experiment that the motor drive system of FIG. 1 makes possible the positional control of the three-phase induction motor 10 to an accuracy of one-second machine angle.

Second Form

Figure 11:
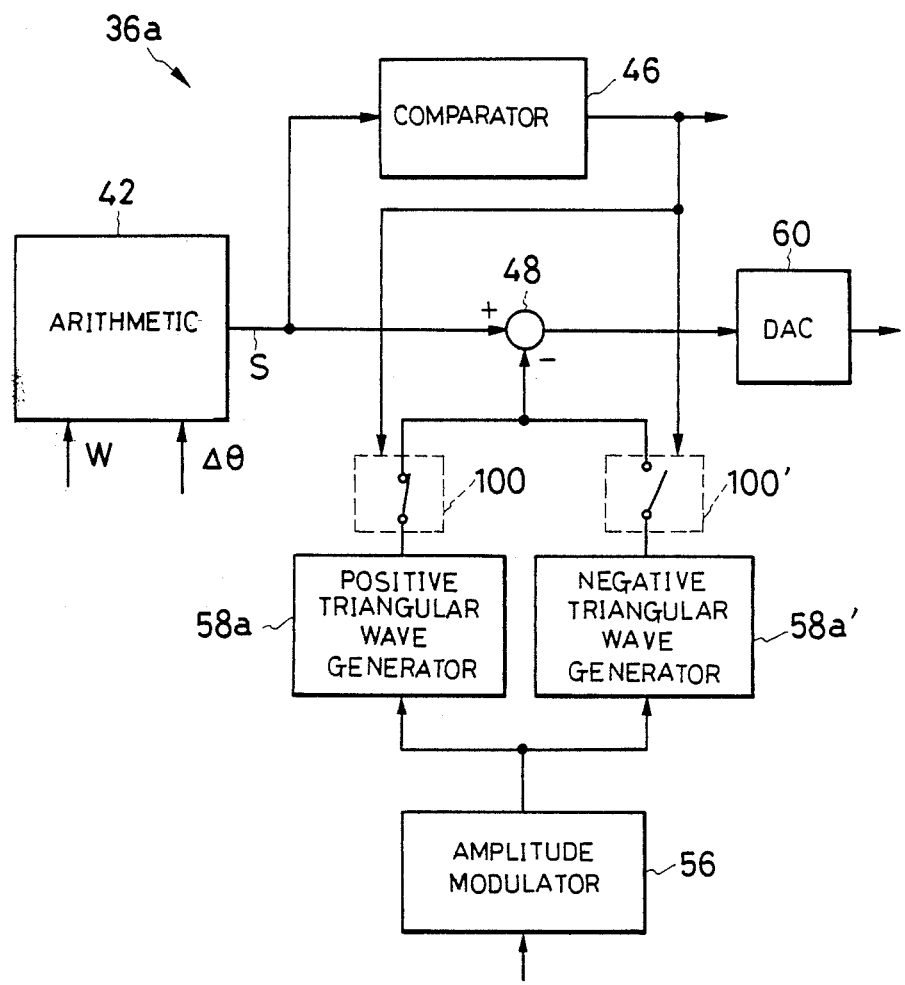
FIG. 11 is a block diagram of an alternative digital signal processor for use in the FIG. 1 system.

FIG. 11 is a partial illustration of an analog equivalent of a modified DSP 36a, shown together with the DAC 60, which may be employed in place of the DSP 36 of the FIG. 1 motor drive system. The modified DSP 36a has the amplitude modulator 56 connected to both a positive triangular wave generator 58a and a negative triangular wave generator 58a'. The outputs of the triangular wave generators 58a and 58a' are connected to the second comparator circuit 48 via respective on-off switches 100 and 100'. These switches are to be opened and closed by the output from the first comparator circuit 46. The absolute value circuit 50 of the FIG. 1 DSP 36 is absent fromt the modified DSP 36a. The other details of construction are as set forth with reference to FIG. 1.

The first switch 100 is closed when the output from the first comparator circuit 46 is high, resulting in the delivery of the positive triangular wave from the first generator 58a to the second comparator circuit 48. The second switch 100' is closed when the output from the first comparator circuit 46 is low, so that the negative triangular wave is fed from the second generator 58a' to the second comparator circuit 48.

We have indicated at (A) in FIG. 12 the positive triangular wave $V_c$ by the solid line and the negative triangular wave $V_c'$ by the dashed line. The value S, being fed directly from the arithmetic circuit 42, can go negative, as at moment $t_5$ in this figure. The first switch 100 is closed to deliver the positive triangular wave $V_c$ to the second comparator circuit 48 when the value S is positive, as before the moment $t_5$. Therefore, as shown in FIG. 12(B), the DAC 60 produces a series of pulses of varying durations through the procedure set forth in connection with FIG. 8, as the second comparator circuit 48 compares the value S with the positive triangular wave $V_c$.

After the value S has become negative at the moment $t_5$, the second switch 100' is closed to deliver the negative triangular wave $V_c'$ to the second comparator circuit 48. As will be understood from (A) and (B) in FIG. 12, the output from the DAC 60 is high when the negative value S is less than the negative triangular wave $V_c'$, as from moment $t_6$ to moment $t_7$, and low when S is more than $V_c'$, as from moment $t_7$ to moment $t_8$.

It is thus seen that the modified DSP 36a makes it possible to read out the desired vector data from the ROM system 18 in the same way as does the FIG. 1 DSP 36.

Possible Modifications

Figure 13:
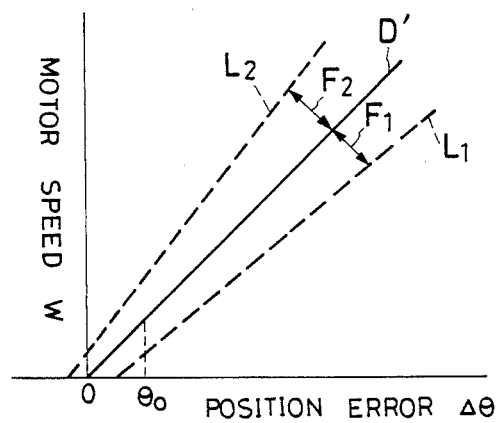
FIG. 13 is a graph similar to FIG. 3 but showing a modified ideal control curve.

Although we have shown and described our invention in terms of some preferred forms, we do not wish our invention to be limited by the exact details of this disclosure. The following, then, is a brief list of possible modifications or alterations of the foregoing disclosure which we believe all fall within the scope of our invention:

1. The IDEAL CONTROL CURVE D of FIG. 3 could be rectilinear as illustrated at D' in FIG. 13. The rectilinear IDEAL CONTROL CURVE D' should satisfy the equation $$K_3\Delta\theta - K_4 W = 0$$

where $K_3$ and $K_4$ are constants. The value S should then be computed by the equation $$S = K_3\Delta\theta - K_4 W.$$

2. The SPEED DATA W could be computed by a more precise method than that of FIG. 1, particularly at low motor speed in the vicinity of the desired position. Such an alternative method is to measure the spacings of the pulses from the position sensor 28 and to obtain the speed from the measured pulse spacings. The pulse spacings may be measured by counting clock pulses that are generated at a sufficiently high repetition rate during each pulse spacing. As an additional alternative, a speed sensor could be provided in addition to the position sensor.

3. The DSP 36 could be replaced by an analog signal processor.

What we claim is:

1. A method of controllably driving a reversible alternating-current motor in revolving the same from one angular position to another, which method comprises:
   (a) providing an inverter having a set of switches to be activated in prescribed on-off patterns to provide forward and reverse voltage vectors and a zero vector for controllably energizing the motor;
   (b) providing memory means having written thereon forward voltage vector data representative of the on-off patterns of the inverter switches for forwardly energizing the motor, reverse voltage vector data representative of the on-off patterns of the inverter switches for reversely energizing the motor, and zero vector data representative of the on-off pattern of the inverter switches for arresting the rotation of the motor;
   (c) generating a position error signal representative of the difference between the actual angular position of the motor and a desired angular position to which the motor is to be revolved;
   (d) generating a motor speed signal representative of the actual running speed of the motor;
   (e) predefining an idal control curve which is representative of the ideal relationship between the motor speed and the difference between the actual and the desired angular position and along which the motor speed is to be controlled in revolving the motor to the desired angular position;
   (f) predefining a controlled acceleration range and an uncontrolled acceleration range on one side of the ideal control curve, and a controlled deceleration range and an uncontrolled deceleration range on the other side of the ideal control curve, both the controlled acceleration range and the controlled deceleration range decreasing in width toward the origin of the rectangular coordinate system on which the ideal control curve is plotted;
   (g) reading out the voltage vector data and zero vector data from the memory means for causing the inverter to controllably energize the motor in order that an actual control curve representative of the actual relationship between the motor speed and the difference between the actual and the desired angular position may approximate the ideal control curve as closely as possible;
   (h) only the forward voltage vector data being read out from the memory means when the actual relation between the motor speed and the difference between the actual and the desired angular position is in the uncontrolled acceleration range, in order to cause the inverter to generate the forward voltage vectors for rapidly accelerating the motor;
   (i) both the forward voltage vector data and the zero vector data being read out from the memory means when the actual relation between the motor speed and the difference between the actual and the desired position is in the controlled acceleration range, in order to cause the inverter to generate the forward voltage vectors and the zero vector for controllably accelerating the motor;
   (j) both the reverse voltage vector data and the zero vector data being read out from the memory means when the actual relation between the motor speed and the difference between the actual and the desired angular position is in the controlled deceleration range, in order to cause the inverter to generate the reverse voltage vectors and the zero vector for controllably decelerating the motor; and
   (k) only the reverse voltage vector data being read out from the memory means when the actual relation between the motor speed and the difference between the motor actual and the desired angular position is in the uncontrolled deceleration range, in order to cause the inverter to generate the reverse voltage vectors for rapidly decelerating the motor.

2. The motor drive method of claim 1 wherein the ideal control curve is plotted in accordance with the equation $$K_1 \cdot \Delta\theta - K_2 \cdot W^2 = 0$$

where $K_1$ and $K_2$ are constants, $\Delta\theta$ is the difference between the actual and desired positions, and W is the motor speed.

3. The motor drive method of claim 1 wherein the ideal control curve is plotted in accordance with the equation $$K_3 \cdot \Delta\theta - K_4 \cdot W = 0$$

where $K_3$ and $K_4$ are constants, $\Delta\theta$ is the difference between the actual and desired positions, and W is the motor speed.

4. The motor drive method of claim 1 wherein the position error signal is generated by comparing at predetermined sampling intervals an actual position signal representative of the actual angular position of the motor with a desired position signal representative of the desired angular position.

5. The motor drive method of claim 4 wherein the motor speed signal is generated from the difference between each sample of the difference between the actual and desired position signals and the preceding sample.

6. The motor drive method of claim 4 wherein the actual position signal is in the form of pulses generated at variable intervals with the rotation of the motor, and wherein the motor speed signal is generated by measuring the time intervals between the successive pulses of the actual position signal.

7. A method of controllably driving a reversible alternating-current motor in revolving the same from one angular position to another, which method comprises:
  (a) providing an inverter having a set of switches to be activated in prescribed on-off patterns to provide forward and reverse voltage vectors and a zero vector for controllably energizing the motor;
  (b) providing memory means having written thereon forward voltage vector data representative of the on-off patterns of the inverter switches for forwardly energizing the motor, reverse voltage vector data representative of the on-off patterns of the inverter switches for reversely energizing the motor, and zero vector data representative of the on-off pattern of the inverter switches for arresting the rotation of the motor;
  (c) generating a position error signal representative of the difference between the actual angular position of the motor and a desired angular position to which the motor is to be revolved;
  (d) generating a motor speed signal representative of the actual running speed of the motor;
  (e) processing the position error signal and the motor speed signal to compute a value S by the equation $$S = K_1 \cdot \Delta\theta - K_2 \cdot W^2$$

where $K_1$ and $K_2$ are constants, $\Delta\theta$ is the difference between the actual and the desired angular position, and W is the motor speed;
  (f) causing the memory means to put out the forward voltage vector data or the zero vector data when the value S is positive, and the reverse voltage vector data or the zero vector data when the value S is negative;
  (g) generating an amplitude-modulated triangular wave having an amplitude decreasing in proportion with the difference between the actual and the desired angular position;
  (h) obtaining the absolute value |S| from the value S; and
  (i) causing the memory means to put out the forward or reverse voltage vector data when the absolute value |S| is of greater magnitude than the triangular wave, and the zero vector data when the absolute value |S| is of less magnitude than the triangular wave.

8. A method of controllably driving a reversible alternating-current motor in revolving the same from one angular position to another, which method comprises:
  (a) providing an inverter having a set of switches to be activated in prescribed on-off patterns to provide forward and reverse voltage vectors and a zero vector for controllably energizing the motor;
  (b) providing memory means having written thereon forward voltage vector data representative of the on-off patterns of the inverter switches for forwardly energizing the motor, reverse voltage vector data representative of the on-off patterns of the inverter switches for reversely energizing the motor, and zero vector data representative of the on-off pattern of the inverter switches for arresting the rotation of the motor;
  (c) generating a position error signal representative of the difference between the actual angular position of the motor and a desired angular position to which the motor is to be revolved;
  (d) generating a motor speed signal representative of the actual running speed of the motor;
  (e) processing the position error signal and the motor speed signal to compute a value S by the equation $$S = K_1 \cdot \Delta\theta - K_2 \cdot W^2$$

where $K_1$ and $K_2$ are constants, $\Delta\theta$ is the difference between the actual and the desired angular position, and W is the motor speed;
  (f) causing the memory means to put out the forward voltage vector data or the zero vector data when the value S is positive, and to put out the reverse voltage vector data or the zero vector data when the value S is negative;
  (g) generating an amplitude-modulated positive triangular wave and an amplitude-modulated negative triangular wave, both positive and negative triangular waves having an amplitude decreasing in proportion with the difference between the actual and the desired angular position;
  (h) comparing the value S with the positive triangular wave when the value S is positive, in order to cause the memory means to put out the forward voltage vector data when the positive value S is of greater magnitude than the positive triangular wave, and to put out the zero vector data when the positive value S is of less magnitude than the positive triangular wave; and
  (i) comparing the value S with the negative triangular wave when the value S is negative, in order to cause the memory means to put out the reverse voltage vector data when the negative value S is of less magnitude than the negative triangular wave, and to put out the zero vector data when the negative value S is of greater magnitude than the negative triangular wave.

9. A method of controllably driving a reversible alternating-current motor in revolving the same from one angular position to another, which method comprises:
  (a) providing an inverter having a set of switches to be activated in prescribed on-off patterns to provide forward and reverse voltage vectors and a zero vector for controllably energizing the motor;
  (b) providing memory means having written thereon forward voltage vector data representative of the on-off patterns of the inverter switches for forwardly energizing the motor, reverse voltage vector data representative of the on-off patterns of the inverter switches for reversely energizing the motor, and zero vector data representative of the on-off pattern of the inverter switches for arresting the rotation of the motor;
  (c) generating a position error signal representative of the difference between the actual angular position of the motor and a desired angular position to which the motor is to be revolved;
  (d) generating a motor speed signal representative of the actual running speed of the motor;
  (e) processing the position error signal and the motor speed signal to compute a value S by the equation $$S = K_1 \cdot \Delta\theta - K_2 \cdot W^2$$

where $K_1$ and $K_2$ are constants, $\Delta\theta$ is the difference between the actual and the desired angular position, and $W$ is the motor speed;

(f) comparing the actual position error value, as represented by the position error signal, with a predetermined position error value which is set in the vicinity of zero;

(g) computing the integral $S_2$ of the actual position error value when the actual position error value grows less than the predetermined position error value;

(h) adding the integral $S_2$ of the actual position error value to the value S to obtain a sum U;

(i) causing the memory means to put out the forward voltage vector data or the zero vector data when the sum U is positive, and to put out the reverse voltage vector data or the zero vector data when the sum U is negative;

(j) generating an amplitude-modulated triangular wave having an amplitude decreasing in proportion with the difference between the actual and the desired angular position;

(k) comparing the relative magnitudes of the value S and the amplitude-modulated triangular wave; and (l) causing thememory means to put out the forward or reverse voltage vector data, or the zero vector data, depending upon the results of comparison of step (k).

10. A method of controllably driving a reversible alternating-current motor in revolving the same from one angular position to another, which method comprises:

(a) providing an inverter having a set of switches to be activated in prescribed on-off patterns to provide forward and reverse voltage vectors and a zero vector for controllably energizing the motor;

(b) providing memory means having written thereon forward voltage vector data representative of the on-off patterns of the inverter switches for forwardly energizing the motor, reverse voltage vector data representative of the on-off patterns of the inverter switches for reversely energizing the motor, and zero vector data representative of the on-off pattern of the inverter switches for arresting the rotation of the motor;

(c) generating a position error signal representative of the difference between the actual angular position of the motor and a desired angular position to which the motor is to be revolved;

(d) generating a motor speed signal representative of the actual running speed of the motor;

(e) processing the position error signal and the motor speed signal to compute a value S by the equation $$S = K_1 \cdot \Delta\theta - K_2 \cdot W^2$$

where $K_1$ and $K_2$ are constants, $\Delta\theta$ is the difference between the actual and the desired angular position, and $W$ is the motor speed;

(f) comparing the actual position error value, as represented by the position error signal, with a predetermined position error value which is set in the vicinity of zero;

(g) computing the integral $S_2$ of the value S when the actual position error value grows less than the predetermined position error value;

(h) adding the integral $S_2$ to the value S to obtain a sum U;

(i) causing the memory means to put out the forward voltage vector data or the zero vector data when the sum U is positive, and to put out the reverse voltage vector data or the zero vector data when the sum U is negative;

(j) generating an amplitude-modulated triangular wave having an amplitude decreasing in proportion with the difference between the actual and the desired angular position;

(k) comparing the relative magnitudes of the value S and the amplitude-modulated triangular wave; and (l) causing the memory means to put out the forward or reverse voltage vector data, or the zero vector data, depending upon the results of comparison of step (k).

11. A systme for controllably driving a reversible alternatin-current motor in revolving the same from one angular position to another, comprising:

(a) an inverter to be connected to the motor, the inverter having a set of switches to be activated in precribed on-off patterns to provide forward and reverse voltage vectors and a zero vector for controllably energizing the motor;

(b) memory means having written thereon forward voltage vector data representative of the on-off patterns of the inverter switches for forwardly energizing the motor, reverse voltage vector data representative of the on-off patterns of the inverter switches for reversely energizing the motor, and zero vector data representative of the on-off pattern of the inverter switches for arresting the rotation of the motor;

(c) a switch control circuit connected between the inverter and the memory means for activating the inverter switches as dictated by the forward and reverse voltage vector data and zero vector data read out from the memory means;

(d) actual position means for providing an actual position signal representative of the actual angular position of the motor;

(e) desired position means for providing a desired position signal representative of a desired angular position to which the motor is to be revolved;

(f) position error means connected to both the actual position means and the desired position means for providing a position error signal representative of the difference between the actual and desired angular positions of the motor by inputting the actual position signal and the desired position signal;

(g) motor speed means for providing a motor speed signal representative of the actual running speed of the motor; and (h) readout means connected between the memory means and the position error means and motor speed means for reading out the voltage vector data and zero vector data from the memory means for causing the inverter to controllably energize the motor in order that an actual control curve representative of the actual relationship between the motor speed and the difference between the actual and the desired angular position may approximate as closely as possible a predefined ideal control curve representative of the ideal relationship therebetween, with a controlled acceleration range and an uncontrolled acceleration range predefined on one side of the ideal control curve, and with a controlled deceleration range and an uncontrolled deceleration range predefined on the other side of the ideal control curve, both the controlled acceleration range and the controlled deceleration range decreasing in width toward the origin of the rectangular coordinate system on which the ideal control curve is plotted;

(i) the readout means causing thememory means to put out:

(1) only the forward voltage vector data when the actual relation between the motor speed and the difference between the actual and the desired angular position is in the uncontrolled acceleration range, in order to cause the inverter to generate the forward voltage vectors for rapidly accelerating the motor;

(2) both the forward voltage vector data and the zero vector data when the actual relation between the motor speed and the difference between the actual an the desired position is in the controlled acceleration range, in order to cause the inverter to generate the forward voltage vectors and the zero vector for controllably accelerating the motor;

(3) both the reverse voltage vector data and the zero vector data when the actual relation between the motor speed and the difference between the actual and the desired angular position is in the controlled deceleration range, in order to cause the inverter to generate the reverse voltage vectors and the zero vector for controllably decelerating the motor; and (4) only the reverse voltage vector data when the actual relation between the motor speed and the difference between the motor actual and the desired angular position is in the uncontrolled deceleration range, in order to cause the inverter to generate the reverse voltage vectors for rapidly decelerating the motor.

12. A system for controllably driving a reversible alternating-current motor in revolving the same from one angular position to another, comprising:

(a) an inverter to be connected to the motor, the inverter having a set of switches to be activated in prescribed on-off patterns to provide forward and reverse voltage vectors and a zero vector for controllably energizing the motor;

(b) memory means having written thereon forward voltage vector data representative of the on-off patterns of the inverter switches for forwardly energizing the motor, reverse voltage vector data representative of the on-off patterns of the inverter switches for reversely energizing the motor, and zero vector data representative of the on-off pattern of the inverter switches for arresting the rotation of the motor;

(c) a switch control circuit connected between the inverter and the memory means for activating the inverter switches as dictated by the forward and reverse voltage vector data and zero vector data read out from the memory means;

(d) actual position means for providing an actual position signal representative of the actual angular position of the motor;

(e) desired position means for providing a desired position signal representative of a desired angular position to which the motor is to be revolved;

(f) position error means connected to both the actual position means and the desired position means for providing a position error signal representative of the difference between the actual and desired angular positions of the motor by inputting the actual position signal and the desired position signal;

(g) motor speed means for providing a motor speed signal representative of the actual running speed of the motor;

(h) arithmetic circuit means connected to both the position error means and the motor speed means for processing the position error signal and the motor speed signal to compute a value S by the equation $$S = K_1 \cdot \Delta\theta - K_2 \cdot W^2$$

where $K_1$ and $K_2$ are constants, $\Delta\theta$ is the difference between the actual and the desired angular position, and W is the motor speed;

(i) first comparator means connected between the arithmetic circuit means and the memory means for causing the latter to put out the forward voltage vector data or the zero vector data when the value S is positive, and the reverse voltage vector data or the zero vector data when the value S is negative;

(j) wave generator means connected to the position error means for generating an amplitude-modulated triangular wave having an amplitude decreasing in proportion with the difference between the actual and the desired angular position;

(k) absolute value means connected to the arithmetic circuit means for providing the absolute value $|S|$ from the value S;

(l) second comparator means connected to both the wave generator means and the absolute value means for causing the memory means to put out the forward or reverse voltage vector data when the absolute value $|S|$ is of greater magnitude than the triangular wave, and the zero vector data when the absolute value $|S|$ is of less magnitude than the triangular wave.

13. A system for controllably driving a reversible alternating-current motor in revolving the same from one angular position to another, comprising:

(a) an inverter to be connected to the motor, the inverter having a set of switches to be activated in prescribed on-off patterns to provide forward and reverse voltage vectors and a zero vector for controllably energizing the motor;

(b) memory means having written thereon forward voltage vector data representative of the on-off patterns of the inverter switches for forwardly energizing the motor, reverse voltage vector data representative of the on-off patterns of the inverter switches for reversely energizing the motor, and zero vector data representative of the on-off pattern of the inverter switches for arresting the rotation of the motor;

(c) a switch control circuit connected between the inverter and the memory means for activating the inverter switches as dictated by the forward and reverse voltage vector data and zero vector data read out from the memory means;

(d) actual position means for providing an actual position signal representative of the actual angular position of the motor;

(e) desired position means for providing a desired position signal representative of a desired angular position to which the motor is to be revolved;
(f) position error means connected to both the actual position means and the desired position means for providing a position error signal representative of the difference between the actual and desired angular positions of the motor by inputting the actual position signal and the desired position signal;
(g) motor speed means for providing a motor speed signal representative of the actual running speed of the motor;
(h) arithmetic circuit means connected to both the position error means and the motor speed means for processing the position error signal and the motor speed signal to compute a value S by the equation $$S = K_1 \cdot \Delta\theta - K_2 \cdot W^2$$

where $K_1$ and $K_2$ are constants, $\Delta\theta$ is the difference between the actual and the desired angular position, and W is the motor speed;
(i) first comparator means connected between the arithmetic circuit means and the memory means for causing the latter to put out the forward voltage vector data or the zero vector data when the value S is positive, and the reverse voltage vector data or the zero vector data when the value S is negative;
(j) wave generator means connected to the position error means for generating an amplitude-modulated positive triangular wave and an amplitude-modulated negative triangular wave, both positive and negative triangular waves having an amplitude decreasing in proportion with the difference between the actual and the desired angular position;
(k) second comparator means connected to both the arithmetic circuit means and the wave generator means for comparing the value S with the positive triangular wave when the value S is positive, in order to cause the memory means to put out the forward voltage vector data when the positive value S is of greater magnitude than the positive triangular wave, and to put out the zero vector data when the positive value S is of less magnitude than the positive triangular wave, the second comparator means comparing the value S with the negative triangular wave when the value S is negative, in order to cause the memory means to put out the reverse voltage vector data when the negative value S is of less magnitude than the negative triangular wave, and to put out the zero vector data when the negative value S is of greater magnitude than the negative triangular wave.

* * * * *

UNITED STATES PATENT AND TRADEMARK OFFICE
CERTIFICATE OF CORRECTION

PATENT NO. : 4,962,976
DATED : October 16, 1990
INVENTOR(S) : Isao Takahashi and Makoto Iwata It is certified that error appears in the above-identified patent and that said Letters Patent is hereby corrected as shown below:

Col. 15, line 52, "idal" should be --ideal--.

Col. 19, line 27, "thememory" should be two words -- the memory--.

Col. 20, line 18, "systme" should be --system--.

Col. 21, line 8, "thememory" should be two words --the memory--.

Signed and Sealed this

Twenty-second Day of September, 1992

Attest:

DOUGLAS B. COMER

*Attesting Officer*  *Acting Commissioner of Patents and Trademarks*